United States Patent [19]
Gooswilligen et al.

[11] Patent Number: 5,939,474
[45] Date of Patent: Aug. 17, 1999

[54] BITUMEN COMPOSITIONS AND A PROCESS FOR THEIR PREPARATION

[75] Inventors: Gerrit Van Gooswilligen; Michael Christopher Phillips; Koen Steernberg, all of Amsterdam, Netherlands

[73] Assignee: Shell Oil Company, Houston, Tex.

[21] Appl. No.: 09/072,704

[22] Filed: May 5, 1998

[30] Foreign Application Priority Data

May 16, 1997 [EP] European Pat. Off. ............. 97303337

[51] Int. Cl.$^6$ ............................. C08L 95/00; C08L 31/00
[52] U.S. Cl. ................................ 524/68; 524/64; 524/69; 524/59
[58] Field of Search ................. 524/68, 69, 59, 524/64

[56] References Cited

U.S. PATENT DOCUMENTS

| | | | |
|---|---|---|---|
| 4,425,454 | 1/1984 | Goodrich | 524/69 |
| 4,454,269 | 6/1984 | Goodrich | 524/69 |
| 4,882,373 | 11/1989 | Moran | 524/68 |
| 5,284,509 | 2/1994 | Kamel et al. | 106/273.1 |
| 5,342,866 | 8/1994 | Trumbore et al. | 524/68 |
| 5,605,946 | 2/1997 | Planche et al. | 524/68 |

FOREIGN PATENT DOCUMENTS

| | | | |
|---|---|---|---|
| 08092486 | 4/1996 | Japan | C08L 95/00 |
| WO 94/16019 | 7/1994 | WIPO | |
| WO 97/19981 | 6/1997 | WIPO | |

OTHER PUBLICATIONS

European Search Report Sep. 14, 1998.

*Primary Examiner*—Vasu Jagannathan
*Assistant Examiner*—Ling-Siu Choi
*Attorney, Agent, or Firm*—Donald F. Haas

[57] ABSTRACT

The invention provides a process for preparing a bitumen composition comprising blowing a mixture with an oxygen-containing gas which mixture comprises a bitumen having a penetration of at least 300 dmm (as measured by ASTM D 5 at 25° C.), a thermoplastic rubber which is present in an amount of less than 10% w, and a bitumen blowing catalyst which is present in an amount in the range of from 1 to 3% w, both based on total mixture; and bitumen compositions obtainable by such process.

9 Claims, No Drawings

BITUMEN COMPOSITIONS AND A PROCESS FOR THEIR PREPARATION

FIELD OF THE INVENTION

The present invention relates to bitumen compositions, a process for their preparation and the use of them in bitumen for industrial applications, in particular roofing applications.

BACKGROUND OF THE INVENTION

Bitumen has developed continually to meet ever-increasing performance demands from for instance building constructors. Advances in building techniques necessitate the development of very high performance roofing felt systems. Such roofing felt systems need to be sufficiently flexible, elastic and resistant to permanent deformation at all service temperatures to accommodate the movement without losing their waterproofing performance.

A known technique to improve the performance of bitumen comprises modifying the bitumen by incorporating into it high levels of a thermoplastic rubber. In this way a higher degree of elasticity and an improved durability can be established.

Another known technique includes subjecting the bitumen to a so-called blowing process, optionally in the presence of a bitumen blowing catalyst, by way of which the temperature susceptibility of the bitumen can be reduced. A combination of the above-mentioned techniques is for instance taught by U.S. Pat. No. 5,342,866 whereby the blowing is carried out under mild conditions and in the presence of a small amount of ferric chloride.

An object of the present invention is to provide a bitumen composition having a higher degree of elasticity and an improved durability when compared with bitumen compositions prepared in a conventional manner. Surprisingly, it has now been found that such bitumen compositions can be prepared by subjecting a particular bitumen mixture to a blowing process.

SUMMARY OF THE INVENTION

Accordingly, the present invention relates to a process for preparing a bitumen composition comprising blowing a mixture with an oxygen-containing gas which mixture comprises a bitumen having a penetration of at least 300 dmm (as measured by ASTM D 5 at 25° C.), a thermoplastic rubber which is present in an amount of less than 10 percent by weight (% w) and a bitumen blowing catalyst which is present in an amount in the range of from 1 to 3% w, based on total mixture. Suitably, the thermoplastic rubber is present in an amount of less than 8% w, preferably in the range of from 1 to 5% w, based on total mixture. Preferably, the bitumen blowing catalyst is present in an amount of less than 2.5% wt, preferably in the range of from 1 to 2% w, based on total mixture.

DETAILED DESCRIPTION OF THE INVENTION

Suitable bitumen blowing catalysts which are all well known in the art include ferric chloride, phosphorus pentoxide, aluminium chloride, boric acid, and phosphoric acid. Preferably use is made of phosphoric acid. Most preferably, the blowing catalyst is phosphoric acid.

The blowing is carried out with an oxygen-containing gas, such as air or pure oxygen. Preferably, use is made of air.

Suitably, the process according to the present invention is carried out at a temperature in the range of from 160 to 350° C., preferably in the range of from 175 to 325° C., more preferably in the range of from 250 to 300° C.

The process according to the present invention may be carried out at ambient pressure or elevated pressure. Normally, however, it will be carried out at ambient pressure.

Suitably, the present process is carried out over a period of time of more than 1 hour, preferably more than 2 hours. Normally, the process is carried over a period of time of not more than 6 hours.

The mixture comprises a thermoplastic rubber. The mixture may comprise one or more different types of thermoplastic rubbers.

Although a wide range of thermoplastic rubbers can suitably be used in accordance with the present invention, the preferred thermoplastic rubbers comprise optionally hydrogenated block copolymers which comprise at least two terminal poly(monovinylaromatic hydrocarbon) blocks and at least one central poly(conjugated diene) block.

Preferably block copolymer constituents are selected from the group consisting of those of the formulae $A(BA)_m$ or $(AB)_n X$, wherein A represents a block of predominantly poly(monovinylaromatic hydrocarbon), wherein B represents a block of predominately poly(conjugated diene), wherein X represents the residue of a multivalent coupling agent and wherein n represents an integer $\geq 1$, preferably $\geq 2$, and m represents an integer $\geq 1$, preferably m is 1.

More preferably the blocks A represent predominantly poly(styrene) blocks and the B blocks represent predominantly poly(butadiene) or poly(isoprene). Multivalent coupling agents to be used include those commonly known in the art.

With the term "predominantly" is meant that the respective blocks A and B may be mainly derived from monovinyl aromatic hydrocarbon monomer and conjugated diene monomer, which monomers may be mixed with other structurally related or non-related co-monomers, e.g. mono-vinyl aromatic hydrocarbon monomer as main component and small amounts (up to 10%) of other monomers or butadiene mixed with isoprene or with small amounts of styrene.

More preferably the copolymers contain pure poly(styrene), pure poly(isoprene) or pure poly(butadiene) blocks, of which the poly(isoprene) or poly(butadiene) blocks may be selectively hydrogenated to at most a residual ethylenic unsaturation of 20% and most preferably less than 5%. Most preferably the applied block copolymer has the structure ABA, wherein A has an apparent molecular weight of from 3000 to 100,000, and preferably from 5,000 to 25,000 and the diblocks AB have an apparent molecular weight of from 50,000 to 170,000 and preferably from 70,000 to 120,000. With the term "apparent molecular weight" as used throughout the specification is meant the molecular weight of a polymer, as measured with gel permeation chromatography (GPC) using poly(styrene) calibration standards. The originally prepared poly(conjugated diene) blocks usually contain from 5 to 65 mol % vinyl groups, originating from 1,2 polymerisation relative to the conjugated diene molecules, and preferably a vinyl content from 10 to 55%. The complete block copolymer to be used according to the present invention, is normally containing polymerised mono-vinyl aromatic hydrocarbon monomer in an amount of from 10 to 60% by weight and preferably from 15 to 45% by weight. The apparent molecular weight of the total block copolymer will normally be in the range of from 15,000 to 500,000 and preferably in the range of from 40,000 to 450,000.

As examples of suitable pure block copolymers can be mentioned KRATON® G-1651, KRATON® G-1654, KRATON® G-1657, KRATON® G-1650, KRATON® G-1701, KRATON® D-1101, KRATON® D-1102, KRATON® D-1107, KRATON® D-1111, KRATON® D-1116, KRATON® D-1117, KRATON® D-1118, KRATON® D-1122, KRATON® D-1135X, KRATON® D-1184, KRATON® D-1144X, KRATON® D-1300X, KRATON® D-4141, and KRATON® D-4158 polymers.

The bitumen may be a residue from distillation of crude oil, a cracked residue, a residue obtained by blowing a crude oil or residues of crude oil distillation or extracts of crude oils, a bitumen derived from propane bitumen, butane bitumen, pentane bitumen or mixtures thereof. Suitably, the bitumens include mixtures of the above bitumens with extenders (fluxes) such as petroleum extracts, e.g. aromatic extracts, distillates or residues. Suitably, the bitumen contains not more than 50% w of an extender, preferably not more than 45% w, based on total bitumen.

The bitumen applied in the present process has a penetration of at least 300 dmm (as measured by ASTM D 5 at 25° C.). The person skilled in the art, however, usually characterizes such bitumen not by its penetration value but by its viscosity at 100° C. (as determined with ASTM D 2171). A penetration of 300 dmm (at 25° C.) corresponds to a viscosity (at 100° C.) of about 1.5 Pa.s. Preferably the bitumen has a viscosity as defined above of at least 0.05 Pa.s, in particular of from 0.1 to 1 Pa.s.

The bitumen composition obtained has suitably a penetration of less than 100 dmm, preferably less than 50 dmm (as measured by ASTM D 5 at 25° C.) and a softening point in the range of 40 to 140s° C., preferably in the range of 80 to 120° C. (as measured by ASTM D 36), and contains less than 10% wt, preferably less than 5% w of any one of the before-mentioned thermoplastic rubbers, based on total bitumen composition. The bitumen composition prepared in accordance with the present invention preferably has a complex shear modulus ($G^*$) in the range of from $1\times10^4$ to $1\times10^7$, in combination with a phase angle ($\delta$) of less than 80, preferably less than 70 (both the $G^*$ and $\delta$ measured according to AASHTO TP5 of the Asphalt Institute (U.S.A.).

Fillers such as carbon black, silica and calcium carbonate, stabilisers, antioxidants, pigments, and solvents are known to be useful in bitumen compositions and can be incorporated in the compositions of this invention in concentrations taught in the art.

As will be understood by the skilled person, the mixture of bitumen and the thermoplastic rubber is preheated before being subjected to the blowing process. The mixture of bitumen and the thermoplastic rubber is normally preheated in a such way to establish an initial mixture temperature in the range of from 160 to 220° C. The bitumen blowing catalyst can be added before or during the actual blowing process. It is preferred to add the catalyst during the blowing process. The bitumen composition prepared in accordance with the present process is considered novel.

Therefore the present invention also relates to a bitumen composition obtainable by the present process as defined hereinbefore.

The present bitumen composition can suitably be used in both road and industrial applications. However, preferably it is applied in industrial applications.

Therefore, present invention still further relates to the use of a bitumen composition as described herein before in industrial, e.g. roofing applications.

EXAMPLE 1

A mixture was prepared based on a 400 penetration bitumen (as measured by ASTM D 5 at 25° C.), a bitumen of Middle East origin which is prepared from a crude oil by distillation. To this bitumen was added 3% w of a block copolymer and 1.5% w of phosphoric acid, both based on total mixture. The block copolymer used was a non-hydrogenated radial polystyrene-polybutadiene block copolymer.

The mixture was prepared by blending the bitumen and the block copolymer. Subsequently, the preheated mixture was blown with air in a blowing vessel at a temperature of 275° C. during 2 hours, whilst phosphoric acid was added. The main properties of the blown bitumen composition are shown in Table 1.

EXAMPLE 2

A comparative blowing process was carried out in a similar way as described in Example 1 except that no phosphoric acid was added. The main properties of the blown bitumen are shown in Table 1.

EXAMPLE 3

A blowing process was carried out in a similar way as described in Example 1 except that instead of phosphoric acid, 1.5% w, based on total mixture, of ferric chloride was added. The main properties of the blown bitumen composition are shown in Table 1.

EXAMPLE 4

A comparative blowing process was carried out in a similar way as described in Example 3 except that 0.2% w of ferric chloride was added based on total mixture. The main properties of the blown bitumen composition are shown in Table 1.

From the results shown in Table 1 it will be clear that with the process according to the present invention (Examples 1 and 3) a hard bitumen composition can be prepared having an attractive elasticity, as shown by low phase angle value and small change in its value at different pressures, whereas with processes falling outside the present invention (Examples 2 and 4) less attractive bitumen compositions are obtained.

TABLE 1

| Example | 1 | 2 | 3 | 4 |
|---|---|---|---|---|
| $\delta$ (°) | | | | |
| at $G^*$: $1 \times 10^4$ (Pa) | 43 | 63 | — | 52 |
| at $G^*$: $1 \times 10^5$ (Pa) | 42 | 53 | 32 | 45 |
| at $G^*$: $1 \times 10^6$ (Pa) | 39 | 45 | 32 | 39 |

We claim:

1. A process for preparing a bitumen composition comprising blowing a mixture with an oxygen-containing gas which mixture comprises a bitumen having a penetration of at least 300 dmm (as measured by ASTM D 5 at 25° C.), a thermoplastic rubber which is present in an amount of less than 10% by weight, and a bitumen blowing catalyst which is present in an amount in the range of from 1 to 3% by weight, both based on total mixture.

2. The process according to claim 1 wherein the thermoplastic rubber is present in an amount of less than 8% by weight, based on total mixture.

3. The process according to claim 1 wherein the mixture is blown with air.

4. The process according to claim 1 wherein a temperature is applied in the range of from 175 to 325° C.

5. The process according to claim 1 wherein the thermoplastic rubber comprises a block copolymer having the formulae $A(BA)_m$ or $(AB)_nX$ wherein A represents a block of predominantly poly(monovinyl-aromatic hydrocarbon) and wherein B represents a block of predominantly poly (conjugated diene), wherein X represents the residue of a multivalent coupling agent and wherein n is an integer $\geq 1$ and m is an integer $\geq 1$.

6. The process according to claim 5 wherein the A blocks are predominantly poly(styrene) blocks and the B blocks are predominantly poly(butadiene) or poly(isoprene) blocks.

7. The process according to claim 1 wherein the bitumen has a viscosity at 100° C. of from 0.1 to 1 Pa.s (as determined by ASTM D 2171).

8. The process according to claim 1 wherein the bitumen blowing catalyst comprises phosphoric acid.

9. The bitumen composition produced by the process of claim 1.

* * * * *